United States Patent
Varma

(10) Patent No.: US 6,819,657 B1
(45) Date of Patent: Nov. 16, 2004

(54) DYNAMIC LINK PARAMETER CONTROL

(75) Inventor: Subir Varma, San Jose, CA (US)

(73) Assignee: Aperto Networks, Inc., Milpitas, CA (US)

(*) Notice: Subject to any disclaimer, the term of this patent is extended or adjusted under 35 U.S.C. 154(b) by 810 days.

(21) Appl. No.: 09/714,783

(22) Filed: Nov. 16, 2000

(51) Int. Cl.⁷ .............................................. H04B 7/005
(52) U.S. Cl. ...................... 370/278; 370/282; 370/294; 370/280
(58) Field of Search ................... 370/278, 280, 370/282, 294, 296, 522, 528

(56) References Cited

U.S. PATENT DOCUMENTS

| | | | |
|---|---|---|---|
| 4,534,025 A | * 8/1985 | Floyd | 370/449 |
| 5,657,325 A | 8/1997 | Lou et al. | |
| 6,081,536 A | * 6/2000 | Gorsuch et al. | 370/468 |
| 6,175,557 B1 | * 1/2001 | Diachina et al. | 370/313 |

FOREIGN PATENT DOCUMENTS

| | | | | |
|---|---|---|---|---|
| DE | 197 28 469 A1 | 7/1999 | | |
| GB | WO 97/17768 | * 5/1997 | ........... | H04B/7/005 |
| WO | WO 97/17768 A1 | 5/1997 | | |
| WO | WO 98/59523 A2 | 12/1998 | | |
| WO | WO 98/59523 A3 | 12/1998 | | |
| WO | WO 99/01959 A2 | 1/1999 | | |
| WO | WO 99/14975 A2 | 3/1999 | | |
| WO | WO 99/14975 A3 | 3/1999 | | |
| WO | WO 99/23844 A3 | 5/1999 | | |
| WO | WO 99/23844 A2 | 5/1999 | | |
| WO | WO 99/44341 A1 | 9/1999 | | |
| WO | WO 01/50633 A1 | 7/2001 | | |
| WO | WO 01/50669 A1 | 7/2001 | | |

OTHER PUBLICATIONS

Seyhan Civanlar and Bharat T. Doshi. "Self–Healing in Wideband Packet Networks". IEEE Network vol. 4 (1990) Jan., No. 1, New York, pp. 35–39. XP 000113853.

* cited by examiner

*Primary Examiner*—Wellington Chin
(74) *Attorney, Agent, or Firm*—Swernofsky Law Group PC

(57) ABSTRACT

The invention provides a method and system for dynamically controlling link parameters during communication between one or more receiver/transmitters. Transmissions are sent as frames from a Base Station Controller to one or more Customer Premises Equipment. Together with a payload, each frame contains a special control message that pre-announces to both the transmitter and receiver the link parameters to be used until changed. The receiving Customer Premises Equipment processes the link parameters and returns a payload of its own within the same frame. With this dynamic approach, link parameters may be changed as often as every frame.

18 Claims, 3 Drawing Sheets

DYNAMIC LINK PARAMETER CONTROL

BACKGROUND OF THE INVENTION

1. Field of the Invention

This invention relates to link parameters in a communication environment involving two or more transmitting and receiving devices.

2. Related Art

Link parameters are used to establish the operational parameters for a communications session between two or more devices. For example, the Link Control Protocol (LCP) establishes, configures, and tests data-link Internet connections. Before establishing communications over a point-to-point link (PPP), each end of the PPP link must send out LCP packets (handshaking). The LCP packet accepts or rejects the identity of its linked peer, agrees upon packet size limits, and looks for common misconfiguration errors. Essentially, the LCP packet checks the telephone line connection to see whether the connection is good enough to sustain data transmission at the intended rate. Generally, link parameters apply equally to wired and wireless networks.

Currently, link parameters at all layers of the protocol stack need to be synchronized between a transmitter and a receiver for communications to take place. When link parameters are static, they can be set at the time that the link is initialized and remain unchanged for the entire communication session. When link parameters are dynamic, then current protocols such as the LCP cited above, require two-way handshaking between the transmitter and the receiver in order to change the link parameters.

Two-way handshaking involves a message from the first station to the second station requesting the change in parameters, followed by, a response from the second station back to the first station agreeing to the change. It is only after the second message is reliably received at the first station, that the new link parameters can take effect.

While this current state of the art accomplishes the task of allowing link parameters to be changed, it suffers from several drawbacks. First, it consumes additional valuable link bandwidth and slows communication, as additional communication is required to coordinate link parameters between two stations. Second, if the link is highly dynamic the situation may arise that the link parameters have to change faster than the time required to do a handshaking procedure. In this case, the handshaking protocol would not work and data could be lost.

Accordingly, it would be advantageous to provide a technique that allows link parameters to be changed quickly and efficiently and avoid the use of two-way handshaking. This is achieved in an embodiment of the invention that is not subject to the drawbacks of the related art.

SUMMARY OF THE INVENTION

The invention provides a method and system for dynamically controlling link parameters during communication between one or more receiver/transmitters. Transmissions are sent as frames from a Base Station Controller to one or more Customer Premises Equipment. Together with a payload, each frame contains a special control message that pre-announces to both the transmitter and receiver the link parameters to be used until changed. The receiving Customer Premises Equipment processes the link parameters and returns a payload of its own within the same frame. With this dynamic approach, link parameters may be changed as often as each frame.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

base station controller (BSC)—in general, a device for performing coordination and control of a wireless communication cell. There is no particular requirement that the base station controller must be a single device; in alternative embodiments, the base station controller can include a portion of a single device, a combination of multiple devices, or some portion thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

time division duplex (TDD)—in general, a type of multiplexing that combines data streams by assigning each stream a different time slot in a frame. In TDD systems the uplink and downlink channels can be considered reciprocal. Hence, in TDD systems uplink channel information may be used to achieve spatially selective transmission.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
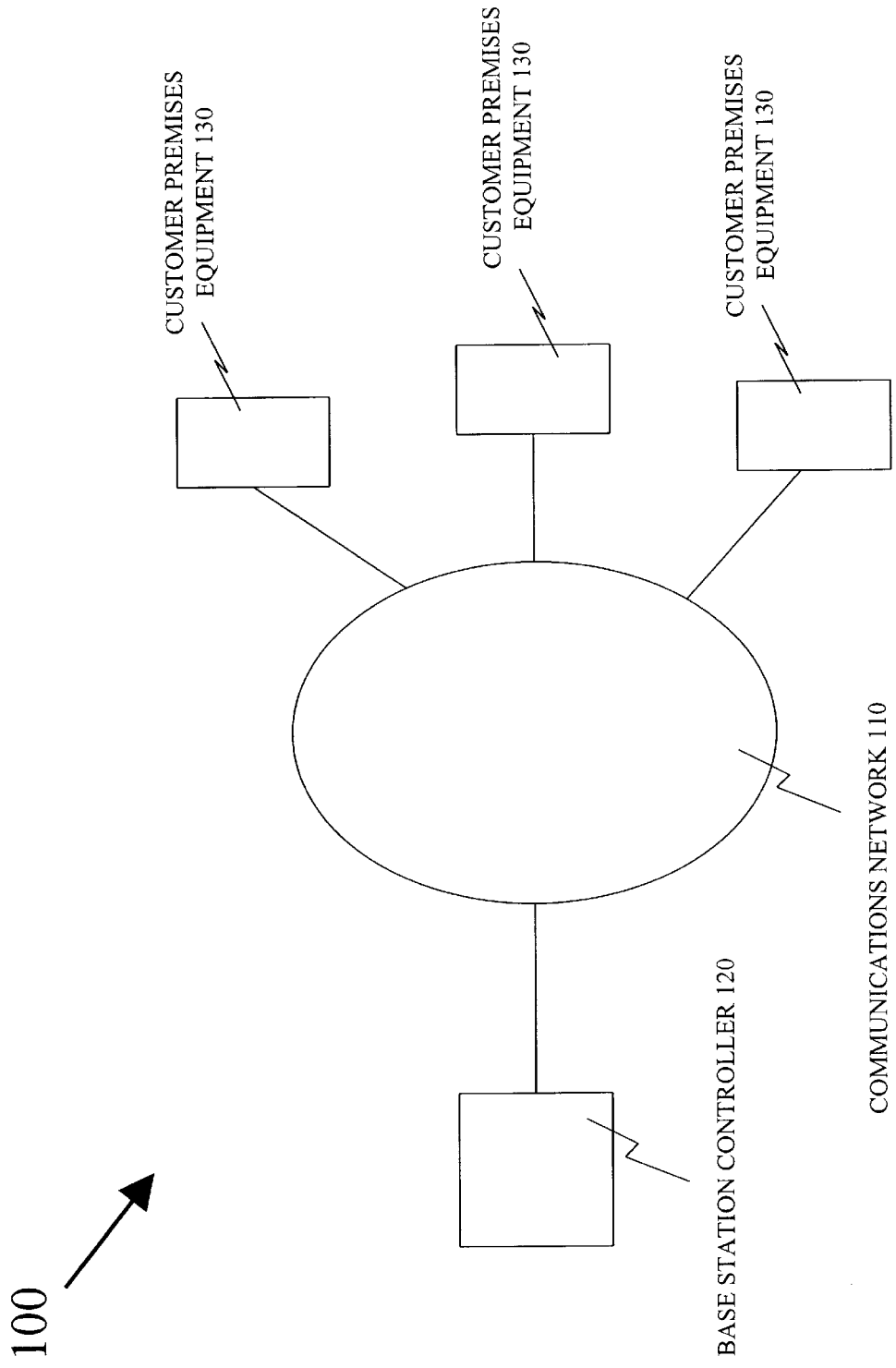
FIG. 1 shows a block diagram of a system for dynamic link parameter control.

FIG. 1 shows a block diagram of a system for dynamic link parameter control.

A system 100 includes a communications network 110, a base station controller (BSC) 120, and one or more customer premises equipment (CPE) 130.

The communications network 110 includes an Internet, intranet, extranet, virtual private network, enterprise network, wireless network, or another form of communications network.

In embodiments of the invention where the communications network 110 is a wireless network, the network is generally a hexagon-shaped region of local surface area (known as a cell), such as might be found in a metropolitan region. Use of generally hexagon-shaped regions is known in the art of wireless communication because it allows a local region to be tiled with substantially no gaps. There is, however, no requirement in any embodiment of the invention that a hexagon-shaped cell be used.

The BSC 120 includes a processor, program and data memory, and mass storage. In embodiments where the BSC 120 is functioning within a wireless network it also includes one or more antennas for sending and/or receiving information using wireless communication techniques.

Similar to the BSC 120, each CPE 130 includes a processor, program and data memory, and mass storage. In embodiments where the CPE 130 is functioning within a wireless network it also includes one or more antennas for sending and/or receiving information using wireless communication techniques.

Communication among devices within the communications network 110 is preferably conducted on a one-to-one basis between each CPE 130 and the BSC 120. Thus, the BSC 120 communicates with each CPE 130, and each CPE 130 communicates with the BSC 120. In a preferred embodiment, no CPE 130 communicates directly with any other CPE 130. In alternate embodiments, however, a CPE 130 may communicate directly with another CPE 130, with the characteristics of such communication being controlled by the BSC 120, by one CPE 130 selected by the BSC 120, or by one CPE 130 mutually agreed upon among the communicating CPE 130.

Communication between the BSC 120 and each CPE 130 is conducted using a TDD technique, in which time durations are divided into repeated individual frames, each one of which includes a "downstream" portion and an "upstream" portion. Unlike existing protocols in which transmissions are controlled by the transmitting side, the BSC 120 controls transmissions for both upstream and downstream directions, without specific requests from the CPE 130.

During the downstream portion of each frame, the BSC 120 transmits, thus sending information to one or more CPE 130. During the upstream portion of each frame, each CPE 130 is potentially allocated a time slot for transmission for sending information to the BSC 120. TDD techniques are known in the art of wireless communication.

Method of Operation

Figure 2:
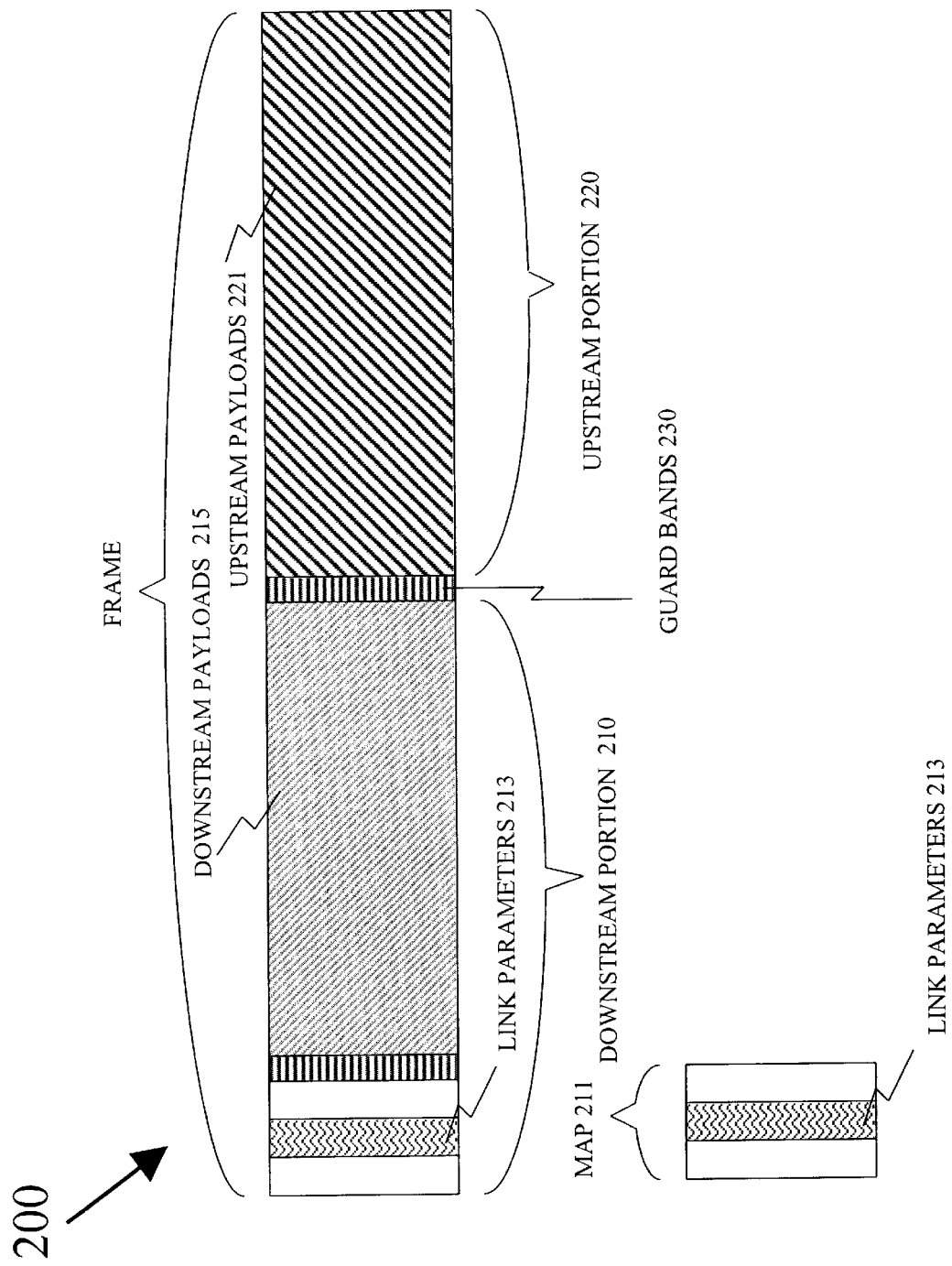
FIG. 2 shows a time division duplex frame used in a system for dynamic link parameter control.

FIG. 2 shows a time division duplex frame used in a system for dynamic link parameter control.

A time division duplex (TDD) frame 200 includes a downstream portion 210, an upstream portion 220, and one or more guard bands 230.

The downstream portion 210 includes a map 211 and a sequence of downstream payloads 215, each sent by the BSC 120 to a selected CPE 130. The map 211 includes one or more link parameters 213 each sent by the BSC 120 to a selected CPE 130. Link parameters 213 contain control link parameters to be interpreted by each CPE 130.

The guard bands 230 provide synchronization of data flow within each frame ensuring that no single CPE 130 interferes with another CPE 130 when receiving from the BSC 120 or transmitting to the BSC 120, and that the downstream portion 210 and upstream portion 220 remain discrete.

Similar to the downstream portion 210, the upstream portion 220 includes a sequence of upstream payloads 221, each sent by a selected CPE 130 to the BSC 120.

The BSC 120 (not the CPE 130), through the use of the link parameters 213, determines the format of the upstream portion 220. This includes, but is not limited to, the length of the upstream payloads 221 and their type of encoding.

Additionally, through the use of the link parameters 213, the BSC 120 controls all the parameters of the established communications session with each CPE 130 (for example, baud rate and parity).

Dynamic control over the upstream portion 220 and the session connection itself is achieved due to the fact that link parameters 213 are embedded within each frame. Thus, for example, a new set of link parameters 213 contained within the downstream portion 210 of frame N can be received by a frame-N-identified CPE 130 along with a request for data element X in a format identified in the new set of link parameters 213. The frame-N-identified CPE 130 can respond by transmitting to the BSC 120 data element X in the identified format within the upstream portion 220 of frame N.

Figure 3:
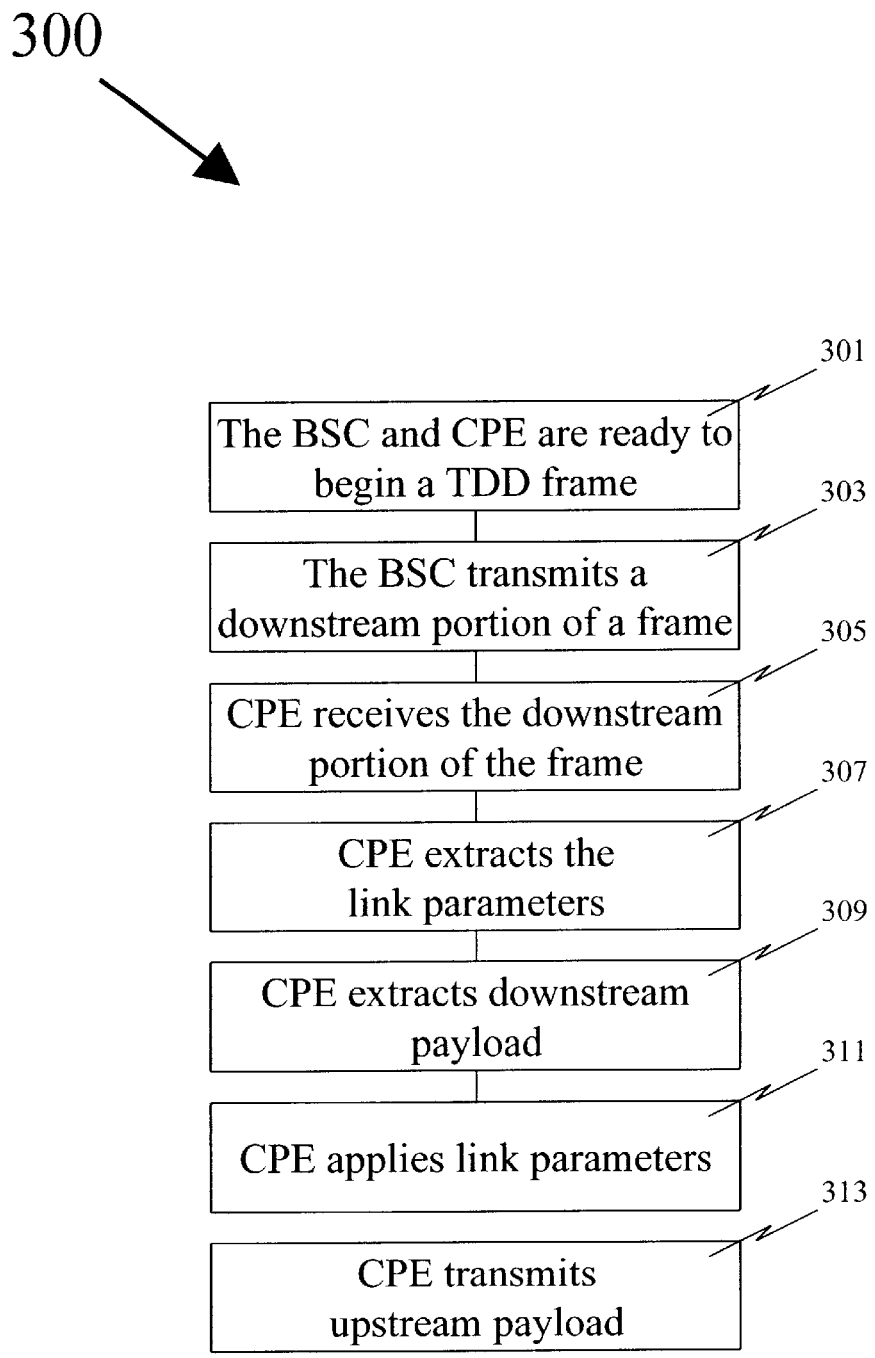
FIG. 3 shows a process flow of a system for dynamic link parameter control.

FIG. 3 shows a process flow of a system for dynamic link parameter control.

A method 300 includes a set of flow points and a set of steps. The system 100 performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order, in which this description lists the steps, except where so indicated.

At a flow point 301, the system 100 is in a quiescent state, and the BSC 120 and CPE 130 are ready to begin a TDD frame.

At a step 303, the BSC 120 transmits the downstream portion 210 of a TDD frame 200 to the CPE 130.

At a step 305, the downstream portion 210 of the TDD frame 200 is received at each CPE 130.

At a step 307, each CPE 130 extracts the link parameters intended for its use from the map 211.

At a step 309, each CPE 130 extracts its intended portion of the downstream payloads 215.

At a step 311, each CPE 130 interprets the link parameters and applies them as appropriate.

At a step 313, each CPE 130 encodes its portion of the upstream payloads 221 and transmits it within the same frame to the BSC 120. Although step 313 would appear to indicate that each CPE 130 transmits its portion of the upstream payloads 221 simultaneously, it should be noted that transmissions from the CPE 130 to the BSC are in fact multiplexed using the guard bands 230 to ensure proper synchronization.

At this step , the BSC 120 and CPE 130 have performed one step of sending and receiving information in a single frame and the process may be repeated at step 301 repeatedly for subsequent frames.

Generality of the Invention

The invention has general applicability to various fields of use, not necessarily related to the services described above.

Other and further applications of the invention in its moss general form, would be clear to those skilled in the art after perusal of this application, and are within the scope and spirit of the invention.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including establishing a communication session between a first station and a second station using a duplex protocol;

receiving at said second station from said first station a downstream transmission within a framed time segment;

extracting at least one link parameter value from said transmission, said link parameter including an indication of a combination of baud rate, upstream payload length, payload encoding, and parity to be used;

modifying said session based on said parameter value; and transmitting from said second station, and within the same said framed time segment, an upstream transmission from said second station.

2. A method as in claim 1, wherein said establishing is accomplished via a wireless network.

3. A method as in claim 1, wherein said establishing is accomplished via a physically connected network.

4. A method as in claim 1, wherein said downstream transmission includes at least one of: a map and a downstream payload.

5. A method as in claim 4, wherein said map includes at least one parameter value.

6. A method as in claim 1, wherein said extracting includes using said at least one parameter value from said map.

7. A method as in claim 1, wherein said modifying includes changing at least one communications parameter of said communications session.

8. A method as in claim 1, wherein said modifying includes changing at least one parameter related to upstream payload.

9. A method as in claim 1, wherein said upstream transmission includes an upstream payload.

10. An apparatus, including means for establishing a communication session between a first station and a second station using a duplex protocol;

means for receiving at said second station from said first station a downstream transmission within a framed time segment;

means for extracting at least one link parameter value from said transmission, said link parameter including an indication of a combination of baud rate, upstream payload length, payload encoding, and parity to be used;

means for modifying said session based on said parameter value; and means for transmitting from said second station, and within the same said framed time segment, an upstream transmission from said second station.

11. The apparatus of claim 10, wherein said means for establishing is accomplished via a wireless network.

12. The apparatus of claim 10, wherein said means for establishing is accomplished via a physically connected network.

13. The apparatus of claim 10, wherein said downstream transmission includes at least one of: a map and a downstream payload.

14. The apparatus of claim 13, wherein said map includes at least one parameter value.

15. The apparatus of claim 10, wherein said means for extracting includes means for using said at least one parameter value from said map.

16. The apparatus of claim 10, wherein said means for modifying includes changing at least one communications parameter of said communications session.

17. The apparatus as in claim 1, wherein said means for modifying includes changing at least one parameter related to upstream payload.

18. The apparatus as in claim 1, wherein said upstream transmission includes an upstream payload.

* * * * *